(12) United States Patent
Yee (10) Patent No.: US 10,895,751 B1
(45) Date of Patent: *Jan. 19, 2021

(54) ADJUSTABLE FACIAL-INTERFACE SYSTEMS FOR HEAD-MOUNTED DISPLAYS

(71) Applicant: FACEBOOK TECHNOLOGIES, LLC, Menlo Park, CA (US)

(72) Inventor: Phillip Yee, San Francisco, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 170 days.

This patent is subject to a terminal disclaimer.

(21) Appl. No.: 15/637,366

(22) Filed: Jun. 29, 2017

(51) Int. Cl.
*G02B 27/01* (2006.01)
*H04M 1/05* (2006.01)
*G02B 27/02* (2006.01)
*G06F 3/01* (2006.01)

(52) U.S. Cl.
CPC ....... *G02B 27/0176* (2013.01); *G02B 27/028* (2013.01); *H04M 1/05* (2013.01); *G02B 27/0172* (2013.01); *G06F 3/011* (2013.01)

(58) Field of Classification Search
CPC ............ G02B 27/0176; G02B 27/0172; G02B 27/017; G02B 27/028; G02B 13/08; G06F 1/1605; H04M 1/05; H04N 5/64
USPC .............................................................. 345/8
See application file for complete search history.

(56) References Cited

U.S. PATENT DOCUMENTS

| | | | |
|---|---|---|---|
| 1,749,676 A | 3/1930 | Sadler et al. | |
| 2,112,644 A | 3/1938 | Bausch | |
| 2,388,713 A | 11/1945 | Schutz et al. | |
| 2,445,203 A | 7/1948 | Bowers | |
| 2,700,765 A | 2/1955 | Hoffmaster | |
| 3,079,917 A | 3/1963 | Pate | |
| 3,406,589 A | 10/1968 | Gaber | |
| 3,492,037 A | 1/1970 | Hutchinson | |
| 3,587,334 A | 6/1971 | Willis | |
| 3,704,353 A | 11/1972 | Halla | |

(Continued)

OTHER PUBLICATIONS

Phillip Yee et al.; Adjustable Facial-Interface Systems for Head-Mounted Displays; U.S. Appl. No. 15/638,334, filed Jun. 29, 2017.

(Continued)

*Primary Examiner* — Fred Tzeng
(74) *Attorney, Agent, or Firm* — FisherBroyles, LLP (57) ABSTRACT

A facial-interface system for a head-mounted display may include a facial interface and a facial-interface adjustment apparatus. The facial-interface adjustment apparatus may include (1) a coupling mount for coupling the facial-interface adjustment apparatus to a head-mounted-display housing, (2) an adjustment protrusion that is movable between a plurality of holding positions relative to the coupling mount, the adjustment protrusion having a facial-interface coupling portion coupled to the facial interface, and (3) a spring that biases the adjustment protrusion in a biasing direction toward the facial interface such that the adjustment protrusion moves between separate holding positions of the plurality of holding positions following application of a compressing force to the adjustment protrusion compressing the spring in a compressing direction opposite the biasing direction. Various other systems, devices, and methods are also disclosed.

20 Claims, 9 Drawing Sheets

(56) References Cited

U.S. PATENT DOCUMENTS

| | | | |
|---|---|---|---|
| 4,136,403 A | 1/1979 | Walther et al. | |
| 4,616,367 A | 10/1986 | Jean, Jr. et al. | |
| 4,869,586 A | 9/1989 | Chung | |
| 5,004,276 A | 4/1991 | Hanley | |
| 5,642,177 A | 6/1997 | Nishioka | |
| 5,657,969 A | 8/1997 | Bivens | |
| 5,724,119 A | 3/1998 | Leight | |
| 5,739,797 A | 4/1998 | Karasawa | |
| 5,739,893 A | 4/1998 | Karasawa | |
| 5,752,276 A | 5/1998 | Baudou | |
| 5,752,280 A | 5/1998 | Hill | |
| 5,815,126 A * | 9/1998 | Fan | G02B 27/017 345/7 |
| 6,215,460 B1 * | 4/2001 | Mizoguchi | G02B 27/0172 345/7 |
| 6,421,031 B1 | 7/2002 | Ronzani | |
| 6,424,321 B1 | 7/2002 | Ronzani | |
| 6,669,250 B1 | 12/2003 | St. Louis | |
| 6,762,885 B1 | 7/2004 | Ogasawara | |
| 6,892,393 B1 | 5/2005 | Provost | |
| 7,200,875 B2 | 4/2007 | Dondero | |
| 7,667,962 B2 | 2/2010 | Mullen | |
| 7,904,128 B2 | 3/2011 | Harmon et al. | |
| 8,959,667 B2 * | 2/2015 | Nakabayashi | G02B 27/0176 2/417 |
| 8,971,023 B2 | 3/2015 | Olsson | |
| 9,423,842 B2 | 8/2016 | Osterhout | |
| 9,442,522 B2 | 9/2016 | Tussy | |
| 9,585,285 B2 | 2/2017 | Nikkhoo | |
| 9,757,534 B2 | 9/2017 | Lang | |
| 9,810,911 B2 * | 11/2017 | Miller | F16M 13/00 |
| 9,889,266 B2 | 2/2018 | Lang | |
| 9,989,998 B1 * | 6/2018 | Yee | G06F 1/163 |
| 10,045,449 B1 * | 8/2018 | Yee | G02B 27/0176 |
| 10,071,307 B1 * | 9/2018 | Castelli | A63F 13/25 |
| 10,133,305 B1 * | 11/2018 | Sullivan | G06F 1/163 |
| 10,274,000 B1 * | 4/2019 | Bulow | F16B 39/00 |
| 10,379,366 B1 * | 8/2019 | Bristol | G02B 27/0176 |
| 2002/0005819 A1 | 1/2002 | Ronzani | |
| 2002/0129433 A1 * | 9/2002 | Shin | A42B 1/247 2/10 |
| 2004/0008158 A1 * | 1/2004 | Chi | G02B 27/0176 345/8 |
| 2005/0146488 A1 * | 7/2005 | Travers | G02B 27/0176 345/8 |
| 2007/0075918 A1 | 4/2007 | Cuprys | |
| 2008/0158506 A1 | 7/2008 | Fuziak | |
| 2009/0040296 A1 * | 2/2009 | Moscato | G02B 27/0172 348/53 |
| 2009/0066607 A1 * | 3/2009 | Yasuda | H04N 13/344 345/8 |
| 2009/0135506 A1 | 5/2009 | Willey | |
| 2011/0194065 A1 | 8/2011 | Belbey | |
| 2011/0225709 A1 | 9/2011 | Saylor | |
| 2013/0249776 A1 | 9/2013 | Olsson | |
| 2013/0335536 A1 * | 12/2013 | Kura | G02B 27/0176 348/53 |
| 2014/0157496 A1 | 6/2014 | Ginther | |
| 2015/0103152 A1 * | 4/2015 | Qin | G02B 27/0176 348/53 |
| 2015/0103306 A1 | 4/2015 | Kaji | |
| 2015/0219901 A1 | 8/2015 | Morimoto | |
| 2015/0238361 A1 | 8/2015 | Mcculloch et al. | |
| 2015/0346494 A1 | 12/2015 | Tanaka | |
| 2016/0011425 A1 | 1/2016 | Thurber et al. | |
| 2016/0041394 A1 | 2/2016 | Tanaka | |
| 2016/0050345 A1 | 2/2016 | Longbotham | |
| 2016/0124230 A1 | 5/2016 | Hino | |
| 2016/0147069 A1 | 5/2016 | Tanaka | |
| 2016/0193070 A1 | 7/2016 | Castillo | |
| 2016/0210782 A1 * | 7/2016 | Thomas | G06T 19/006 |
| 2016/0210784 A1 * | 7/2016 | Ramsby | G06T 19/006 |
| 2016/0249124 A1 * | 8/2016 | Drinkwater | G06F 1/1605 |
| 2016/0363772 A1 * | 12/2016 | Miller | F16M 13/00 |
| 2017/0052393 A1 * | 2/2017 | Kweon | G02C 13/003 |
| 2017/0082859 A1 * | 3/2017 | Drinkwater | G02B 27/0176 |
| 2017/0105874 A1 | 4/2017 | Reynolds et al. | |
| 2017/0304721 A1 | 10/2017 | Manuel et al. | |
| 2017/0307896 A1 * | 10/2017 | Kovaluk | G02B 27/0176 |
| 2017/0318281 A1 * | 11/2017 | Edlund | G03B 35/18 |
| 2017/0326322 A1 | 11/2017 | Lang | |
| 2018/0003986 A1 * | 1/2018 | Guo | G02B 27/0176 |
| 2018/0024369 A1 * | 1/2018 | Kato | H04N 5/64 359/13 |
| 2018/0095498 A1 | 4/2018 | Raffle et al. | |

OTHER PUBLICATIONS

Sullivan et al.; Facial-Interface Systems for Head-Mounted Displays; U.S. Appl. No. 15/495,775, filed Apr. 24, 2017.

Phillip Yee et al.; Adjustable Facial-Interface Systems for Head-Mounted Displays; U.S. Appl. No. 15/652,550, filed Jul. 18, 2017.

Phillip Yee et al.; Adjustable Facial-Interface Systems for Head-Mounted Displays; U.S. Appl. No. 15/652,565, filed Jul. 18, 2017.

* cited by examiner

FIG. 9

ADJUSTABLE FACIAL-INTERFACE SYSTEMS FOR HEAD-MOUNTED DISPLAYS

BACKGROUND

Putting on a virtual reality headset may be the beginning of a thrilling experience, one that may be more immersive than almost any other digital entertainment or simulation experience available today. Virtual reality headsets may enable users to travel through space and time, interact with friends in a three-dimensional world, or play video games in a radically redefined way. Virtual reality headsets may also be used for purposes other than recreation-governments may use them for military training simulations, doctors may use them to practice surgery, and engineers may use them as visualization aids.

Conventional virtual reality headsets often include cushioned facial interfaces that allow users to position the headsets on their faces. However, a particular cushioned facial interface may not comfortably fit users having various head or face shapes or users who also wear glasses while wearing head-mounted displays. Unfortunately, in order to adjust the fit of a facial interface, users typically must remove a facial-interface cushion from a facial interface and replace it with a cushion of a different size to obtain a desired fit. Accordingly, users often cannot properly adjust the fit of a headset without having a replacement facial interface or interface cushion available.

SUMMARY

As will be described in greater detail below, the instant disclosure generally relates to adjustable facial-interface systems for head-mounted displays, head-mounted-display devices, and methods for assembling adjustable facial-interface systems. In one example, a facial-interface system for a head-mounted display may include a facial interface and a facial-interface adjustment apparatus. The facial-interface adjustment apparatus may include (1) a coupling mount for coupling the facial-interface adjustment apparatus to a head-mounted-display housing, (2) an adjustment protrusion that is movable between a plurality of holding positions relative to the coupling mount, the adjustment protrusion having a facial-interface coupling portion coupled to the facial interface, and (3) a spring that biases the adjustment protrusion in a biasing direction toward the facial interface such that the adjustment protrusion moves between separate holding positions of the plurality of holding positions following application of a compressing force to the adjustment protrusion compressing the spring in a compressing direction opposite the biasing direction. The compressing force may, for example, be applied to the adjustment protrusion via the facial interface. In at least one example, the spring may be a compression spring.

In at least one embodiment, the facial-interface adjustment apparatus may further include a spring holding member attached to the coupling mount and the spring may be disposed between the spring holding member and a spring abutment surface of the adjustment protrusion. The facial-interface adjustment apparatus may also include an adjustment-apparatus casing surrounding at least a portion of the adjustment protrusion and the spring. The facial-interface may be disposed at a separate one of a plurality of locations relative to the head-mounted-display housing when the adjustment protrusion is held at each of the plurality of holding positions.

According to some embodiments, the facial-interface adjustment apparatus may further include a holding projection that extends into a recessed path defined in the adjustment protrusion and the recessed path may move relative to the holding projection when the adjustment protrusion moves between the separate holding positions of the plurality of holding positions. The recessed path may include, for example, a plurality of holding notches, with each of the plurality of holding notches corresponding to a separate holding position of the plurality of holding positions. In this example, the holding projection may be alternately secured within each of the plurality of holding notches by a biasing force applied by the spring to the adjustment protrusion in the biasing direction. In at least one embodiment, the application of the compressing force to the adjustment protrusion may move a holding notch of the plurality holding notches securing the holding projection away from the holding projection. In this example, following the application of the compressing force to the adjustment protrusion, the biasing force applied by the spring to the adjustment protrusion may move another holding notch of the plurality of holding notches toward the holding projection. The facial-interface adjustment apparatus may further include a holding-projection biasing member that biases the holding projection into the recessed path. In at least one example, the recessed path may be a looped path.

A head-mounted-display device may include (1) a facial interface, (2) a head-mounted-display housing, and (3) a facial-interface adjustment apparatus. The facial-interface adjustment apparatus may include (1) a coupling mount that couples the facial-interface adjustment apparatus to the head-mounted-display housing, (2) an adjustment protrusion that is movable between a plurality of holding positions relative to the head-mounted-display housing, with the adjustment protrusion having a facial-interface coupling portion coupled to the facial interface, and (3) a spring that biases the adjustment protrusion in a biasing direction toward the facial interface such that the adjustment protrusion moves between separate holding positions of the plurality of holding positions following application of a compressing force to the adjustment protrusion compressing the spring in a compressing direction opposite the biasing direction. In some embodiments, the coupling mount may be disposed adjacent a viewing opening defined in the head-mounted-display housing.

A corresponding method may include positioning a spring between a spring holding member attached to a coupling mount for coupling to a head-mounted-display housing and a spring abutment surface of an adjustment protrusion that is movable between a plurality of holding positions relative to the coupling mount such that (1) the spring biases the adjustment protrusion in a biasing direction toward a facial-interface coupling portion of the adjustment protrusion and (2) the adjustment protrusion moves between separate holding positions of the plurality of holding positions following application of a compressing force to the adjustment protrusion compressing the spring between the spring holding member and the spring abutment surface in a compressing direction opposite the biasing direction. The method may also include coupling a facial interface to the facial-interface coupling portion of the adjustment protrusion.

According to at least one embodiment, the method may also include coupling the coupling mount to the head-mounted-display housing. In some examples, the method may additionally include coupling a holding projection to the coupling mount such that (1) the holding projection extends into a recessed path defined in the adjustment protrusion and (2) the recessed path moves relative to the holding projection when the adjustment protrusion moves between the separate holding positions of the plurality of holding positions.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown byway of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various adjustable facial-interface systems for head-mounted displays, head-mounted-display devices, and methods for assembling adjustable facial-interface systems. As will be explained in greater detail below, embodiments of the instant disclosure may include facial-interface systems having facial-interface adjustment apparatuses that enable users to quickly and easily adjust facial interfaces. The facial-interface adjustment apparatuses may be coupled to head-mounted-display housings and may include spring-actuated adjustment protrusions that are movable between two or more holding positions relative to the head-mounted-display housings. The facial-interface systems may thus enable users to position the facial interfaces so as to comfortably fit head-mounted displays to various user face sizes and shapes. The facial-interface systems may also enable users to wear accessories, such as glasses, while wearing the head-mounted displays. Accordingly, the facial-interface systems may allow users to adjust and comfortably wear head-mounted displays without having to replace the facial interfaces and/or interface cushions.

Reference will now be made to various exemplary embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known systems, methods, procedures, components, circuits, and networks have not been described in detail so as not to unnecessarily obscure aspects of the embodiments.

Figure 1:
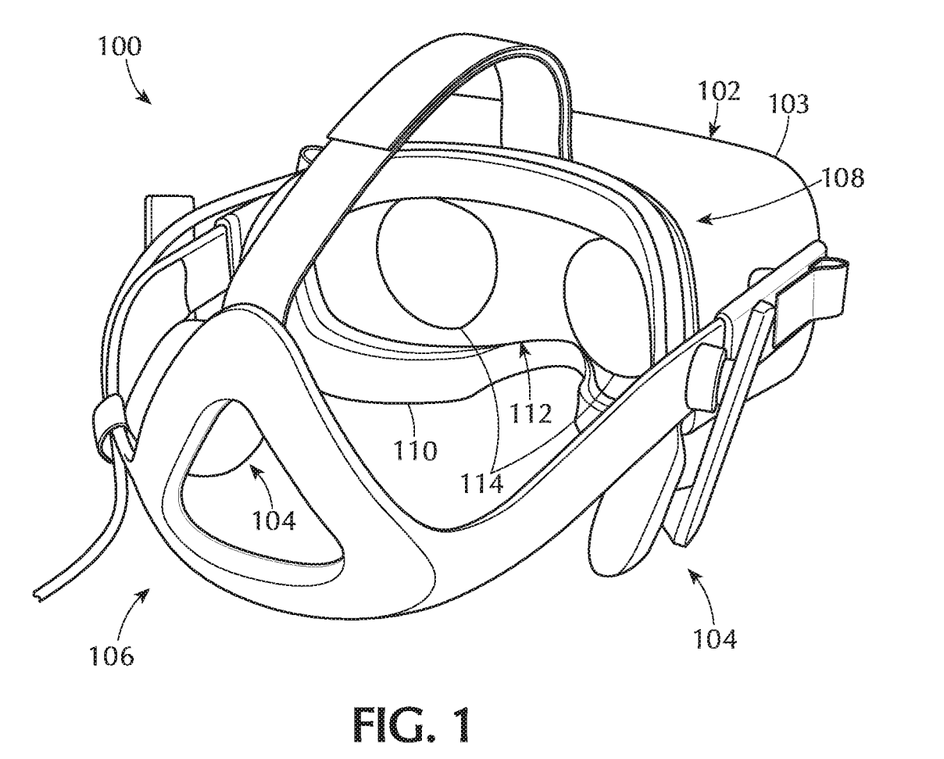
FIG. 1 is a perspective view of an exemplary head-mounted-display system in accordance with some embodiments.

The following will provide, with reference to FIG. 1, examples of head-mounted-display systems that include adjustable facial-interface systems. In addition, the discussion corresponding to FIGS. 2-5E will provide examples of adjustable facial-interface systems. The discussion corresponding to FIGS. 6-8 will also provide examples of head-mounted-display devices that include adjustable facial-interface systems. Finally, the discussion corresponding to FIG. 9 will provide examples of methods for assembling adjustable facial-interface systems.

FIG. 1 is a perspective view of a head-mounted-display system 100 in accordance with some embodiments. In some embodiments, head-mounted-display system 100 may include a head-mounted display 102, audio subsystems 104, a strap assembly 106, and a facial-interface system 108. The term "head-mounted display," as used herein, generally refers to any type or form of display device or system that is worn on or about a user's head and displays visual content to the user. Head-mounted displays may display content in any suitable manner, including via a screen (e.g., an LCD or LED screen), a projector, a cathode ray tube, an optical mixer, etc. Head-mounted displays may display content in one or more of various media formats. For example, a head-mounted display may display video, photos, and/or computer-generated imagery (CGI). Head-mounted display 102 may include a head-mounted-display housing 103 surrounding various components of head-mounted display 102, including lenses 114 and various electronic components, including display components as described above.

Head-mounted displays may provide diverse and distinctive user experiences. Some head-mounted displays may provide virtual-reality experiences (i.e., they may display computer-generated or pre-recorded content), while other head-mounted displays may provide real-world experiences (i.e., they may display live imagery from the physical world). Head-mounted displays may also provide any mixture of live and virtual content. For example, virtual content may be projected onto the physical world (e.g., via optical or video see-through), which may result in augmented reality or mixed reality experiences. Head-mounted displays may be configured to be mounted to a user's head in a number of ways. Some head-mounted displays may be incorporated into glasses or visors. Other head-mounted displays may be incorporated into helmets, hats, or other headwear. Examples of head-mounted displays may include OCULUS RIFT, GOOGLE GLASS, VIVE, SAMSUNG GEAR, etc.

In some embodiments, audio subsystems 104 may be integrated with head-mounted display 102 and may provide audio signals to the user's ears. Head-mounted-display system 100 may, for example, have two audio subsystems 104 located on the left and right sides of head-mounted-display system 100 to provide audio signals to the user's left and right ears, as shown in FIG. 1.

Strap assembly 106 may be used for adjustably mounting head-mounted display 102 on the user's head. As shown in FIG. 1, strap assembly 106 may include various straps, such as an upper strap and lower straps, that are coupled to head-mounted display 102 to adjustably conform to the top and/or sides of the user's head when the user is wearing head-mounted display 102.

In some embodiments, facial-interface system 108 may be configured to comfortably rest against a region of the user's face, including a region surrounding the user's eyes, when head-mounted-display system 100 is worn by the user. In these embodiments, facial-interface system 108 may include a facial interface 110 that contacts selected regions of the user's face. Facial interface 110 may surround a viewing region 112 that includes the user's field of vision while the user is wearing head-mounted-display system 100, allowing the user to look through lenses 114 of head-mounted display 102 without interference from outside light while the user is wearing head-mounted-display system 100.

Figure 2:
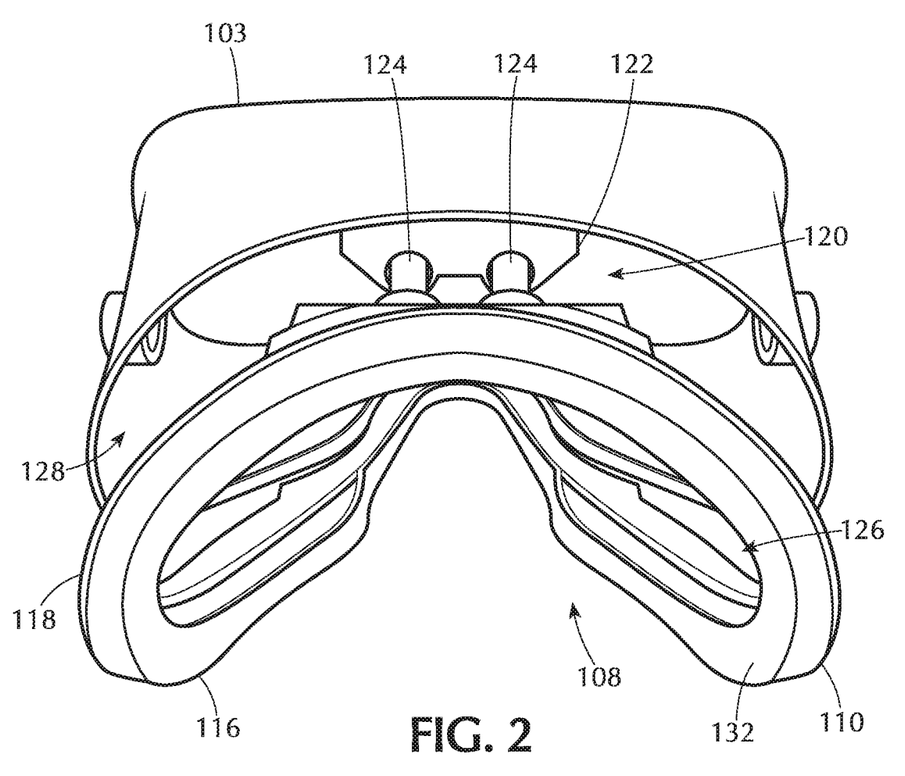
FIG. 2 is a perspective view of an exemplary facial-interface adjustment apparatus coupled to a facial-interface and a head-mounted-display housing in accordance with some embodiments.

FIG. 2 is a perspective view of a facial-interface adjustment apparatus 120 coupled to facial interface 110 and head-mounted-display housing 103. As shown in FIG. 2, facial-interface adjustment apparatus 120 may include an adjustment-apparatus casing 122 and one or more adjustment protrusions 124 extending from openings defined in adjustment-apparatus casing 122. Adjustment protrusions 124 may extend between adjustment-apparatus casing 122 and facial interface 110 and may be movable with respect to adjustment-apparatus casing 122 in a lengthwise direction of adjustment protrusions 124, as will be described in greater detail below.

Facial interface 110 may include an interface cushion 116 and an interface mounting member 118. In some embodiments, interface cushion 116 may include or be formed from a pliable material. For example, interface cushion 116 may include or be formed from a foam material (e.g., polyurethane foam) and/or any other pliable material suitable for contacting a facial region of a user and/or suitable for conforming to a shape of interface mounting member 118. In some examples, the pliable material may enable interface cushion 116 to conform to a mounting surface of interface mounting member 118. In at least one example, interface cushion 116 may include multiple cushion layers and/or a covering layer over at least a portion of interface cushion 116. Interface mounting member 118 may be formed of a material having greater rigiditythan interface cushion 116, such as a hard or semi-hard polymeric and/or metallic material.

Interface cushion 116 may include a facial-abutment surface 132 that is configured to abut facial regions of the user when head-mounted-display system 100 is worn by the user. For example, facial-abutment surface 132 may be configured to abut at least a portion of the user's nose, cheek, and/or forehead facial regions. Interface cushion 116 may be mounted to interface mounting member 118 at a side of interface cushion 116 opposite facial-abutment surface 132.

Facial interface 110 may define a viewing opening 126, which corresponds to, for example, viewing region 112 illustrated in FIG. 1. In some embodiments, adjustment protrusions 124 of facial-interface adjustment apparatus 120 may be coupled to interface mounting member 118 such that facial interface 110 moves in conjunction with adjustment protrusions 124.

Head-mounted-display housing 103 may be shaped and sized to surround various components of head-mounted display 102 including lenses 114 shown in FIG. 1 and various electronic components, including display components for displaying images to a user through lenses 114. Head-mounted-display housing 103 may be formed of a hard material, such as a polymeric and/or metallic material, that covers and protects interior components of head-mounted display 102. Head-mounted-display housing 103 may include a housing opening 128 adjacent facial interface 110. In some embodiments, housing opening 128 may be shaped and sized to surround and/or abut at least a portion of facial interface 110, including at least a portion of interface mounting member 118.

In some embodiments, adjustment-apparatus casing 122 of facial-interface adjustment apparatus 120 may be disposed in head-mounted-display housing 103 adjacent housing opening 128. Additionally or alternatively, facial-interface adjustment apparatus 120 may be disposed at an interior location within head-mounted-display housing 103 that is inward from housing opening 128. In at least one embodiment, adjustment protrusions 124 may extend through housing opening 128 such that at least a portion of facial interface 110 is disposed outside head-mounted-display housing 103. In some embodiments, adjustment protrusions 124 may be entirely surrounded by head-mounted-display housing 103 when adjustment protrusions 124 are in at least one holding position such that at least a portion of facial interface 110 extends through housing opening 128 and into head-mounted-display housing 103. As illustrated in FIG. 2, facial-interface adjustment apparatus 120 may be coupled to a portion of facial interface 110 that includes a portion of facial-abutment surface 132 configured to abut a forehead region of a user's face. Additionally or alternatively, head-mounted display 102 may include one or more facial-interface adjustment apparatuses and/or adjustment protrusions that are coupled to one or more portions of facial interface 110 configured to abut other regions of a user's face, including temple regions, cheek regions, and/or nasal regions of the user's face (see, e.g., FIGS. 6-8).

Figure 3A:
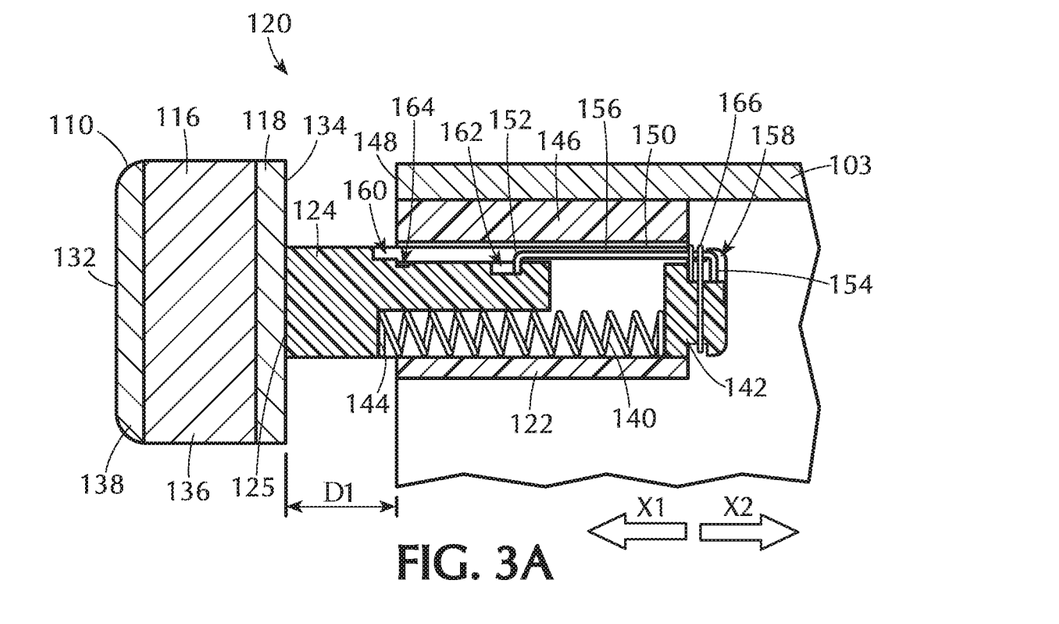
FIGS. 3A and 3B are cross-sectional views of an exemplary facial-interface adjustment apparatus coupled to a facial-interface and a head-mounted-display housing in accordance with some embodiments.
Figure 3B:
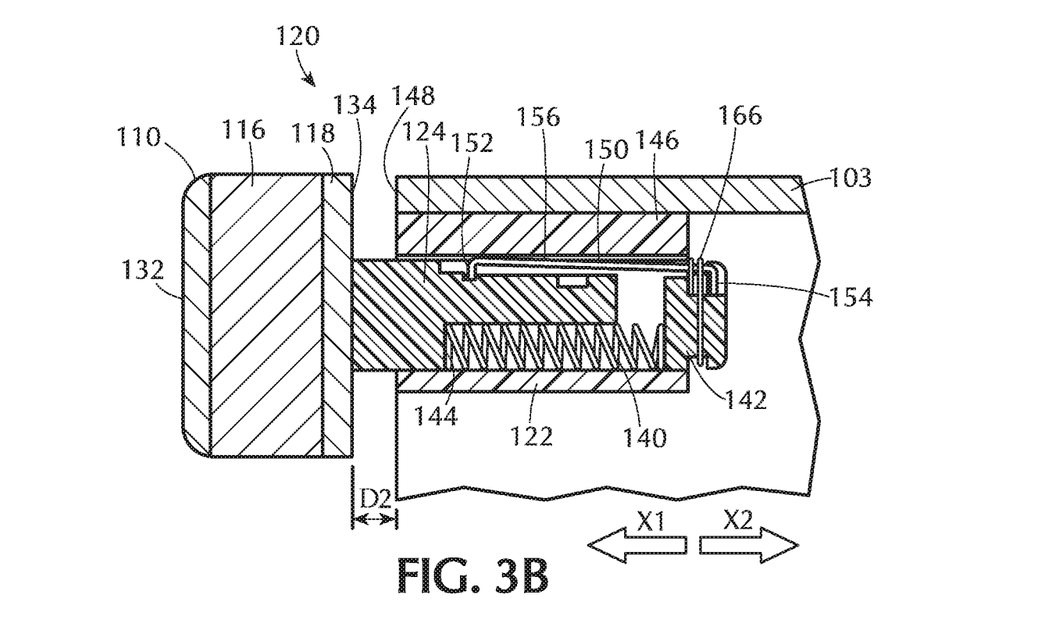

FIGS. 3A and 3B are cross-sectional views of facial-interface adjustment apparatus 120 coupled to facial interface 110 and head-mounted-display housing 103. FIG. 3A illustrates facial-interface adjustment apparatus 120 with an adjustment protrusion 124 disposed in an extended holding position and FIG. 3B illustrates facial-interface adjustment apparatus 120 with adjustment protrusion 124 disposed in a contracted holding position. FIGS. 3A and 3B show a portion of facial interface 110 that is disposed outside of head-mounted-display housing 103 by adjustment protrusion 124 when adjustment protrusion 124 is in the extended holding position and in the contracted holding position. Additionally or alternatively, at least a portion of facial interface 110 may be disposed within head-mounted-display housing 103 when adjustment protrusion 124 is in at least one of the extended holding position and the contracted holding position.

As shown in FIGS. 3A and 3B, interface cushion 116 may include a first cushion layer 136 mounted to interface mounting member 118 and a second cushion layer 138 that includes facial-abutment surface 132. Interface mounting member 118 of facial interface 110 may include a display-side surface 134 on a side facing toward head-mounted-display housing 103 and/or facial-interface adjustment apparatus 120. A user-side surface 148 of head-mounted-display housing 103 may surround housing opening 128 shown in FIG. 2. In some examples, user-side surface 148 of head-mounted-display housing 103 may face toward facial interface 110.

According to some embodiments facial-interface adjustment apparatus 120 may include a coupling mount 146 that couples facial-interface adjustment apparatus 120 to head-mounted-display housing 103. Coupling mount 146 may be bonded and/or mechanically attached to head-mounted-display housing 103 in any suitable manner, without limitation. In at least one example, coupling mount 146 may be part of adjustment-apparatus casing 122. Adjustment protrusion 124 may include a facial-interface coupling portion 125 at an end disposed away from adjustment-apparatus casing 122 and coupling mount 146. Facial-interface coupling portion 125 may be coupled to facial interface 110 at and/or adjacent to display-side surface 134 of facial interface 110. Adjustment protrusion 124 may be directly or indirectly coupled to facial interface 110 in any suitable manner, without limitation. For example, facial-interface coupling portion 125 of adjustment protrusion 124 may be may be bonded, mechanically attached, and/or magnetically attached to facial interface 110.

As shown in FIGS. 3A and 3B, a portion of adjustment protrusion 124 may be disposed within adjustment-apparatus casing 122. Adjustment protrusion 124 may have any suitable shape and size, without limitation. For example, as illustrated in FIGS. 2-3B, at least a portion of adjustment protrusion 124 may have a cylindrical shape that fits within a corresponding recess or through-hole, such as a cylindrical recess and/or any other suitably shaped recess, defined in adjustment-apparatus casing 122. Alternatively, adjustment protrusion 124 may have any other suitable shape, such as a rectangular-parallelepiped-shaped protrusion. Adjustment protrusion 124 may be movable with respect to adjustment-apparatus casing 122 and head-mounted-display housing 103 in a biasing direction X1 and a compressing direction X2 opposite biasing direction X1.

According to at least one embodiment, facial-interface adjustment apparatus 120 may include a spring 140 that biases adjustment protrusion 124 in biasing direction X1 toward facial interface 110. For example, spring 140 may be disposed within adjustment-apparatus casing 122. Spring 140 may be any suitable type of spring, including, for example, a compression spring. In some embodiments, facial-interface adjustment apparatus 120 may include a spring holding member 142, which is attached to coupling mount 146 and/or adjustment-apparatus casing 122. Spring 140 may be disposed between spring holding member 142 and a spring abutment surface 144 of adjustment protrusion 124 such that spring 140 is compressible between holding member 142 and spring abutment surface 144. Spring 140 may be disposed between spring holding member 142 and a spring abutment surface 144 in a partially compressed state so that spring 140 exerts a force against spring abutment surface 144 in biasing direction X1 when adjustment protrusion 124 is in both the extended holding position shown in FIG. 3A and the contracted holding position shown in FIG. 3B.

In some embodiments, adjustment protrusion 124 may move between separate holding positions of a plurality of holding positions following application of a compressing force to adjustment protrusion 124 that compresses spring 140 in compressing direction X2. For example, a compressing force may be applied to adjustment protrusion 124 by a user via facial interface 110. In at least one example, a user may manually force facial interface 110 in compressing direction X2 to move facial interface 110 and adjustment protrusion 124 toward head-mounted-display housing 103 and adjustment-apparatus casing 122 when the compressing force applied by the user exceeds the biasing force exerted on adjustment protrusion 124 by spring 140. As adjustment protrusion 124 is forced in compressing direction X2, spring 140 may be compressed between spring abutment surface 144 and spring holding member 142. The user may subsequently relax the compressing force applied to facial interface 110 and the biasing force of spring 140 may move adjustment protrusion 124 in biasing direction X1 until adjustment protrusion 124 is held in either the extended holding position or the compressed holding position.

According to some embodiments, adjustment protrusion 124 may alternate successively between a plurality of holding positions. For example, adjustment protrusion 124 may alternate between the extended holding position illustrated in FIG. 3A and the contracted holding position illustrated in FIG. 3B. In at least one embodiment, adjustment protrusion 124 may alternate between any suitable number of separate holding positions, without limitation. When adjustment protrusion 124 is initially held in the extended holding position, adjustment protrusion 124 may subsequently be held in the contracted holding position after being forced in compressing direction X2 by the user. Alternatively, when adjustment protrusion 124 is initially held in the contracted holding position, adjustment protrusion 124 may subsequently be held in the extended holding position after being forced in compressing direction X2 by the user. In at least one example, adjustment protrusion 124 may move to a separate holding position after the user moves adjustment protrusion 124 beyond a threshold point in direction X2. In this example, if the user does not move adjustment protrusion 124 beyond the threshold point in direction X2, adjustment protrusion 124 may return to the same holding position after the user relaxes the compressing force applied to adjustment protrusion 124.

In some embodiments, facial-interface adjustment apparatus 120 may include an adjustment-protrusion restraining member 150 that holds adjustment protrusion 124 in one of a plurality of holding positions when a compressing force is not applied to adjustment protrusion in compressing direction X2. For example, adjustment-protrusion restraining member 150 may hold adjustment protrusion 124 in either the extended holding position or the contracted holding position at a given time. Adjustment-protrusion restraining member 150 may include a holding projection 152 that abuts at a portion of adjustment protrusion 124 to restrain movement of adjustment protrusion 124, thereby preventing movement of adjustment protrusion 124 in biasing direction X1 beyond a selected point. Adjustment-protrusion restraining member 150 may also include an anchor portion 154 that anchors adjustment-protrusion restraining member 150 to spring holding member 142 and/or adjustment-apparatus casing 122, thereby preventing movement of adjustment-protrusion restraining member 150 in biasing direction X1 relative to adjustment-apparatus casing 122 and head-mounted-display housing 103. In at least one example, anchor portion 154 may be disposed within an anchor recess 158 defined within a portion of facial-interface adjustment apparatus 120, such as a portion of spring holding member 142 and/or adjustment-apparatus casing 122.

A holding-projection biasing member 166 may secure anchor portion 154 within anchor recess 158. In some examples, holding-projection biasing member 166 may be a spring or fastening member that surrounds a portion of adjustment-protrusion restraining member 150 and a portion of spring holding member 142 and/or adjustment-apparatus casing 122. Accordingly, adjustment protrusion 124 may move relative to adjustment-protrusion restraining member 150 in biasing direction X1 and compressing direction X2. Adjustment-protrusion restraining member 150 may also include an extending portion 156 that extends between anchor portion 154 and holding projection 152. In some examples, extending portion 156 may extend generally parallel to biasing direction X1. Adjustment-protrusion restraining member 150 may be formed of any suitable material, such as, for example, a metallic and or plastic material having limited flexibility. In one embodiment, adjustment-protrusion restraining member 150 may be a rod-shaped member, such as a cylindrical rod, with opposite end portions that are bent to form holding projection 152 and anchor portion 154.

According to at least one embodiment, holding projection 152 may be disposed within a recessed path 160 defined within a portion of adjustment protrusion 124. As adjustment protrusion 124 moves in biasing direction X1 or in compressing direction X2, recessed path 160 may move relative to holding projection 152, as will be described in greater detail below with respect to FIGS. 4-5E. Holding-projection biasing member 166 may bias extending portion 156 and holding projection 152 toward recessed path 160 such that holding projection 152 is held within recessed path 160 as adjustment protrusion 124 moves in biasing direction X1 and compressing direction X2. In some embodiments, recessed path 160 may include a plurality of holding-position notches. For example, as illustrated in FIGS. 3A and 3B, recessed path 160 may include an extended-holding-position notch 162 and a contracted-holding-position notch 164 respectively corresponding to the extended holding position and the contracted holding position.

When a compressing force is not applied by a user to adjustment protrusion 124, holding projection 152 may be held within either extended-holding-position notch 162 or contracted-holding-position notch 164. For example, the biasing force of spring 140 in biasing direction X1 may hold holding projection 152 within either extended-holding-position notch 162 or contracted-holding-position notch 164 by forcing a portion of adjustment protrusion 124 defining extended-holding-position notch 162 or contracted-holding-position notch 164 against holding projection 152. During application of a compressing force by a user to adjustment protrusion 124 in compressing direction X2, one of extended-holding-position notch 162 and contracted-holding-position notch 164 may be moved away from holding projection 152, and following application of the compressing force by the user, the other of extended-holding-position notch 162 and contracted-holding-position notch 164 may be disposed adjacent holding projection 152. Accordingly, holding projection 152 may be alternately disposed within extended-holding-position notch 162 and contracted-holding-position notch 164 as a user successively forces adjustment protrusion 124 in compressing direction X2 such that adjustment protrusion 124 alternates between the extended holding position and the contracted holding position.

When adjustment protrusion 124 is disposed in the extended holding position, facial interface 110 may be disposed at a first position relative to adjustment-apparatus casing 122 and head-mounted-display housing 103, and when adjustment protrusion 124 is disposed in the contracted holding position, facial interface 110 may be disposed at a second position relative to adjustment-apparatus casing 122 and head-mounted-display housing 103. For example, as shown in FIG. 3A, a portion of facial interface 110 may be disposed at a distance D1 from adjustment-apparatus casing 122 and/or head-mounted-display housing 103 when adjustment protrusion 124 is in the extended position. As shown in FIG. 3B, the portion of facial interface 110 may be disposed at a distance D2 from adjustment-apparatus casing 122 and/or head-mounted-display housing 103 that is less than distance D1 when adjustment protrusion 124 is in the contracted position.

Accordingly, a user may quickly and easily adjust the position of facial interface 110 relative to head-mounted-display housing 103 by manually applying pressure to facial interface 110 to force facial interface 110 in compressing direction X2 and subsequently releasing the applied pressure from facial interface 110. In some embodiments, the amount of force required to overcome the biasing force of spring 140 may be greater than an amount of force applied by a user's face to facial interface 110 when the user is securely wearing head-mounted-display system 100. As such, the user may tighten strap assembly 106 of head-mounted-display system 100 to securely and comfortably mount head-mounted-display system 100 to their head without inadvertently compressing spring 140 and triggering a positional adjustment of facial interface 110 by facial-interface adjustment apparatus 120.

Figure 4:
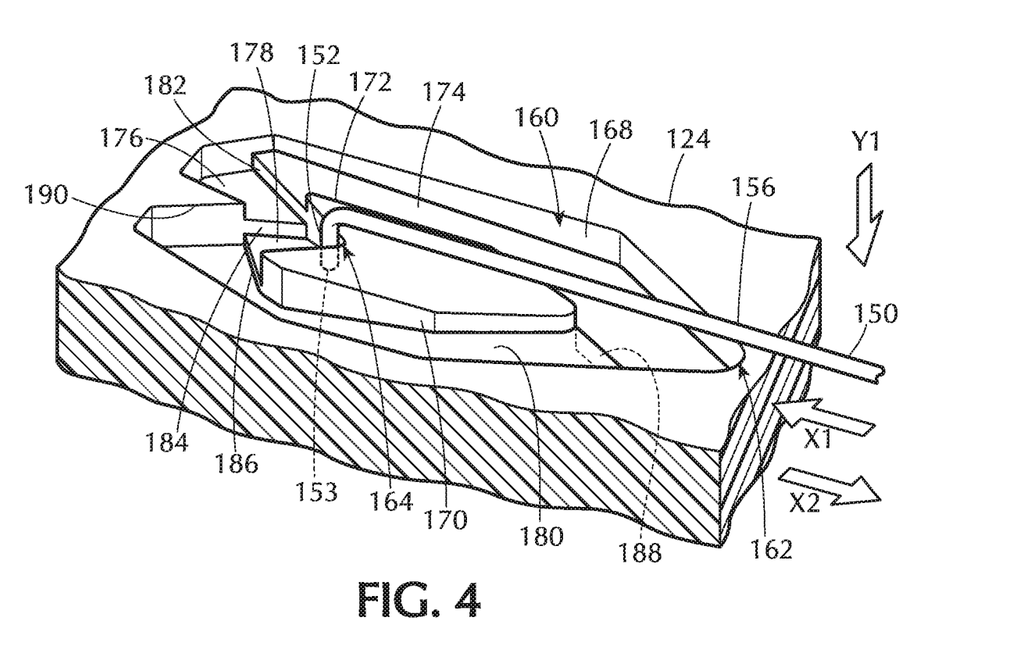
FIG. 4 is a cut-away perspective view of a portion of an exemplary facial-interface adjustment apparatus in accordance with some embodiments.

FIG. 4 is a cut-away perspective view of a portion of facial-interface adjustment apparatus 120. FIG. 4 shows additional detail of portions of adjustment protrusion 124 defining recessed path 160 and portions of adjustment-protrusion restraining member 150 according to at least one embodiment. As shown in this figure, adjustment protrusion 124 may be movable with respect to adjustment-protrusion restraining member 150 in biasing direction X1 and compressing direction X2. Additionally, extending portion 156 and holding projection 152 of adjustment-protrusion restraining member 150 may be biased in direction Y1 by, for example, holding-projection biasing member 166 shown in FIGS. 3A and 3B.

According to some embodiments, recessed path 160 may be a looped path defined by an outer surface 168 and an inner surface 170 of adjustment protrusion 124. The looped path may, for example, surround an inner portion 172 of adjustment protrusion 124. Between outer surface 168 and inner surface 170, recessed path 160 may be defined by a plurality of surfaces of adjustment protrusion 124, one or more of which may be sloped relative to biasing direction X1 and compressing direction X2. In at least one example, as illustrated in FIG. 4, recessed path 160 may be defined by a first tracking surface 174, a second tracking surface 176, a third tracking surface 178, and a fourth tracking surface 180. As adjustment protrusion 124 moves in biasing direction X1 and compressing direction X2, extending portion 156 of adjustment-protrusion restraining member 150 may have sufficient flexibility to move in directions generally perpendicular to biasing direction X1 and compressing direction X2 such that holding projection 152 remains within recessed path 160 and a projection end surface 153 of holding projection 152 consecutively abuts each of first tracking surface 174, second tracking surface 176, third tracking surface 178, and fourth tracking surface 180 between outer surface 168 and inner surface 170.

In at least one example, adjustment protrusion 124 may also include a plurality of shoulders defining portions of recessed path 160 between outer surface 168 and inner surface 170. For example, as shown in FIG. 4, adjustment protrusion 124 may include a first shoulder 182 between first tracking surface 174 and second tracking surface 176, a second shoulder 184 between second tracking surface 176 and third tracking surface 178, a third shoulder 186 between third tracking surface 178 and fourth tracking surface 180, and a fourth shoulder 188 between fourth tracking surface 180 and first tracking surface 174. Each of these shoulders may ensure that holding projection 152 tracks recessed path 160 in a specified direction (e.g., a clockwise direction or a counter-clockwise direction) around the looped path of recessed path 160 as adjustment protrusion 124 is moved in biasing direction X1 and compressing direction X2 relative to holding projection 152. For example, as holding projection 152 passes over a shoulder (e.g., in a counter-clockwise direction), the shoulder may prevent holding projection 152 from passing back over the shoulder in an opposite direction (e.g., a clockwise direction). Adjustment protrusion 124 may also include an inward extending portion 190 that extends toward contracted-holding-position notch 164.

FIGS. 5A-5E are cut-away top views of a portion of facial-interface adjustment apparatus 120. These figures illustrate the movement and positioning of holding projection 152 of adjustment-protrusion restraining member 150 as adjustment protrusion 124 is alternately moved in biasing direction X1 and compressing direction X2.

Figure 5A:
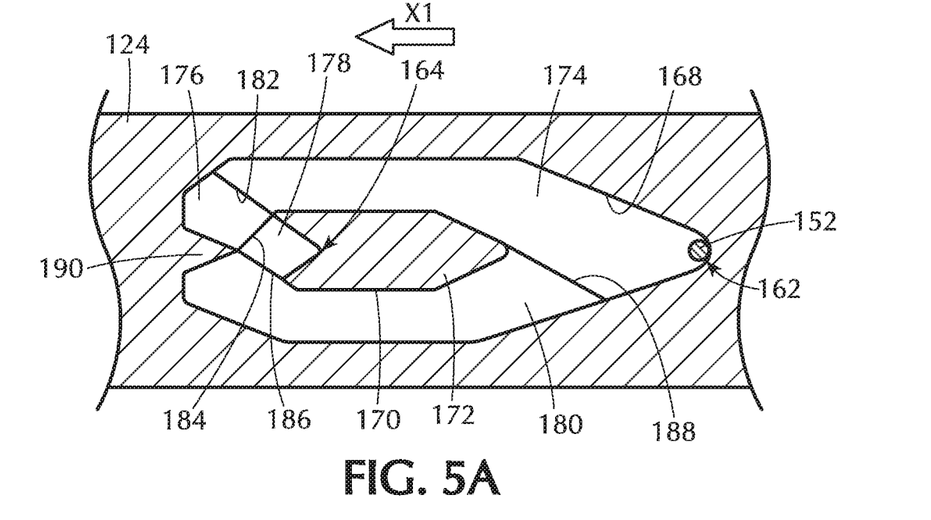
FIGS. 5A-5E are cut-away top views of a portion of an exemplary facial-interface adjustment apparatus in accordance with some embodiments.

FIG. 5A illustrates holding projection 152 disposed within extended-holding-position notch 162. The configuration shown in FIG. 5A corresponds to FIG. 3A, in which adjustment protrusion 124 is disposed in the extended holding position. In this configuration, a compressing force is not applied to adjustment protrusion 124 by a user and spring 140 shown in FIG. 3A applies a biasing force to adjustment protrusion 124 in biasing direction X1. Holding projection 152 may be held in extended-holding-position notch 162 as a portion of outer surface 168 defining extended-holding-position notch 162 is forced against holding projection 152 in biasing direction X1.

Figure 5B:
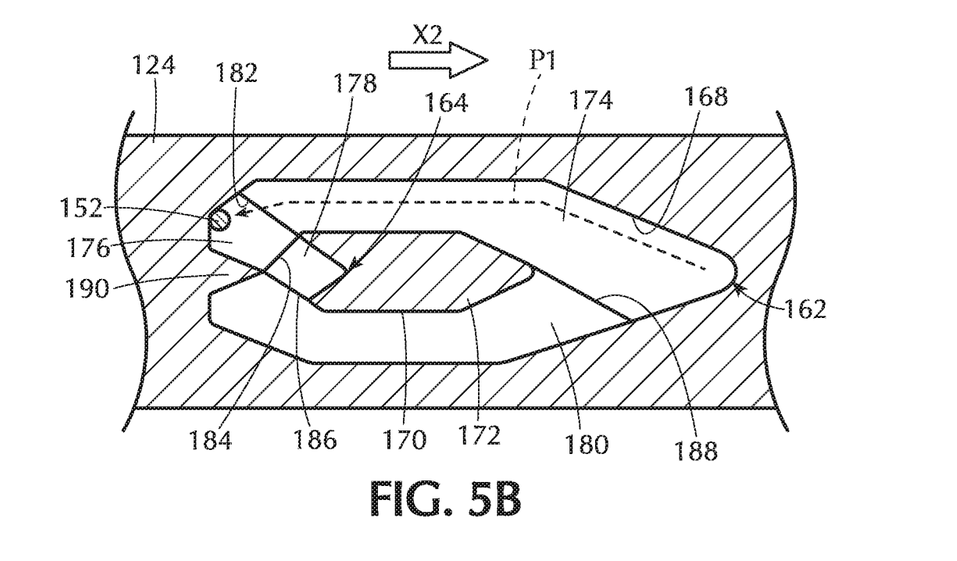

As shown in FIG. 5B, as the user applies a compressing force in compressing direction X2 to adjustment protrusion 124 sufficient to overcome the biasing force of spring 140, adjustment protrusion 124 may move in compressing direction X2 such that holding projection 152 follows path P1 from extended-holding-position notch 162 and over first tracking surface 174 and first shoulder 182 onto second tracking surface 176.

Figure 5C:
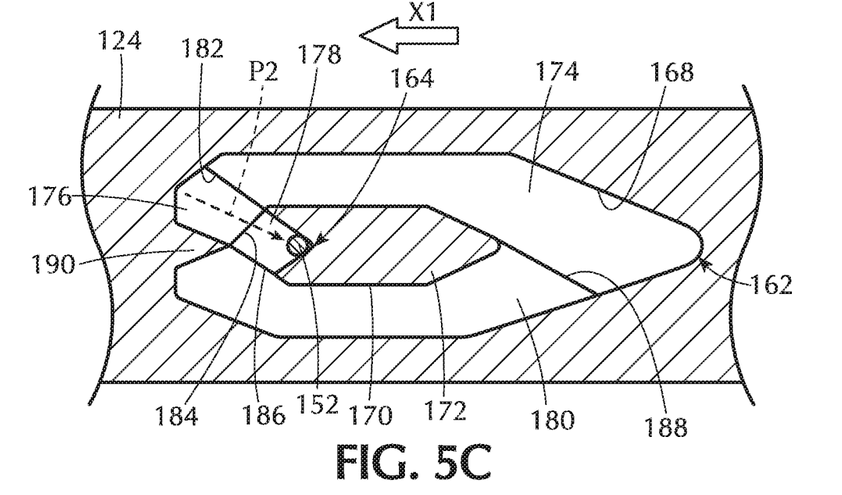
Figure 5D:
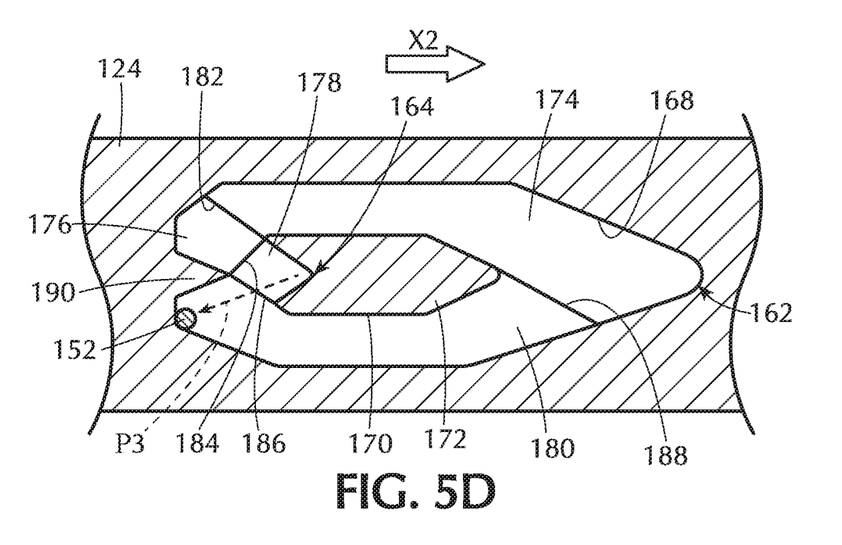

Subsequently, as shown in FIG. 5C, when the user discontinues application of the compressing force to adjustment protrusion 124, the biasing force applied by spring 140 may move adjustment protrusion 124 in biasing direction X1 such that holding projection 152 follows path P2 over second tracking surface 176 and second shoulder 184 onto third tracking surface 178. Holding projection 152 may be prevented from returning to first tracking surface 174 by first shoulder 182. In some examples, first shoulder 182 and/or inward extending portion 190 may direct holding projection 152 onto third tracking surface 178. When holding projection 152 is disposed on third tracking surface 178, holding projection 152 may be held in contracted-holding-position notch 164 as a portion of inner surface 170 defining contracted-holding-position notch 164 is forced against holding projection 152 in biasing direction X1. The configuration shown in FIG. 5C corresponds to FIG. 3B, in which adjustment protrusion 124 is disposed in the contracted holding position.

As shown in FIG. 5D, as the user again applies a compressing force in compressing direction X2 to adjustment protrusion 124 sufficient to overcome the biasing force of spring 140, adjustment protrusion 124 may move in compressing direction X2 such that holding projection 152 follows path P3 from contracted-holding-position notch 164 and over third tracking surface 178 and third shoulder 186 onto fourth tracking surface 180. Holding projection 152 may be prevented from returning to second tracking surface 176 by second shoulder 184. In some examples, second shoulder 184 and/or inward extending portion 190 may direct holding projection 152 onto fourth tracking surface 180.

Figure 5E:
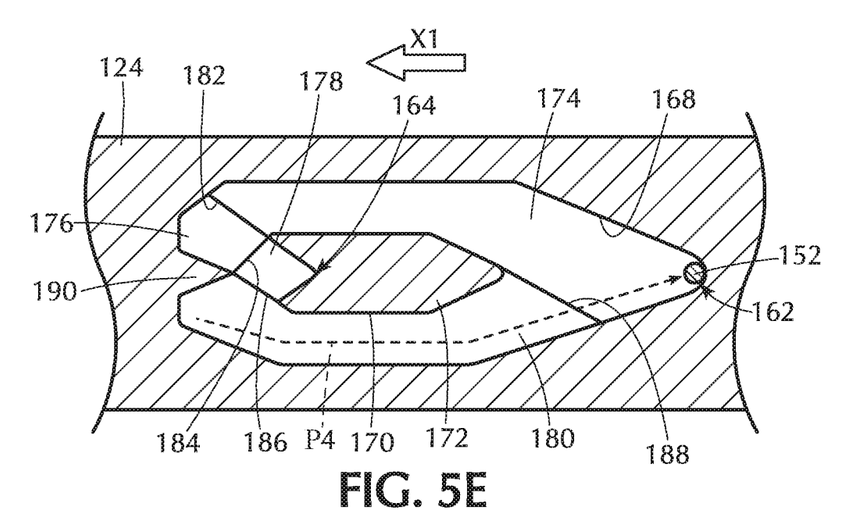

Then, as shown in FIG. 5E, when the user discontinues application of the compressing force to adjustment protrusion 124, the biasing force applied by spring 140 may move adjustment protrusion 124 in biasing direction X1 such that holding projection 152 follows path P4 over fourth tracking surface 180 and fourth shoulder 188 onto first tracking surface 174, where holding projection 152 is again disposed within extended-holding-position notch 162 in the same configuration as that shown in FIG. 5A. In the configuration shown in FIG. 5E, adjustment protrusion 124 is disposed in the extended holding position illustrated in FIG. 3A.

Figure 6:
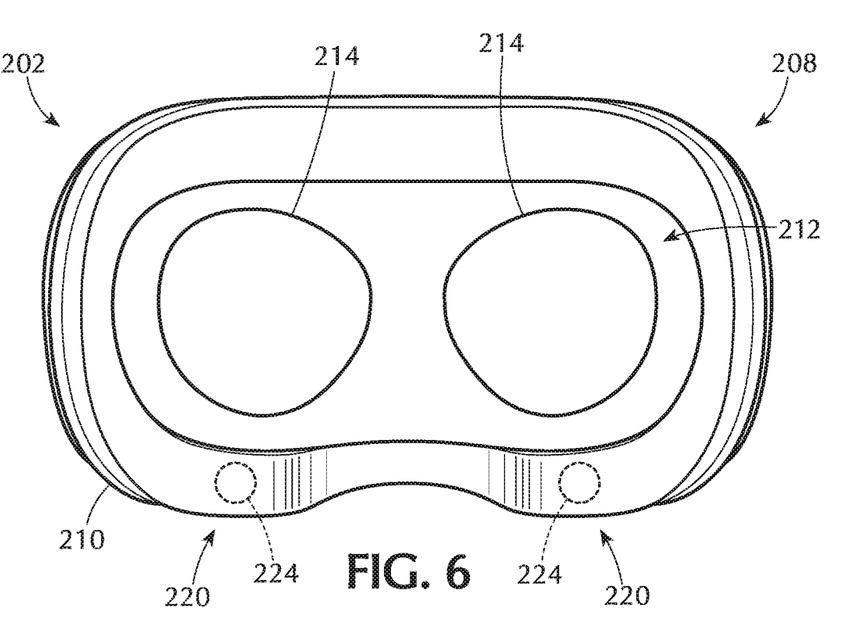
FIG. 6 is a front view of an exemplary head-mounted display in accordance with some embodiments.
Figure 7:
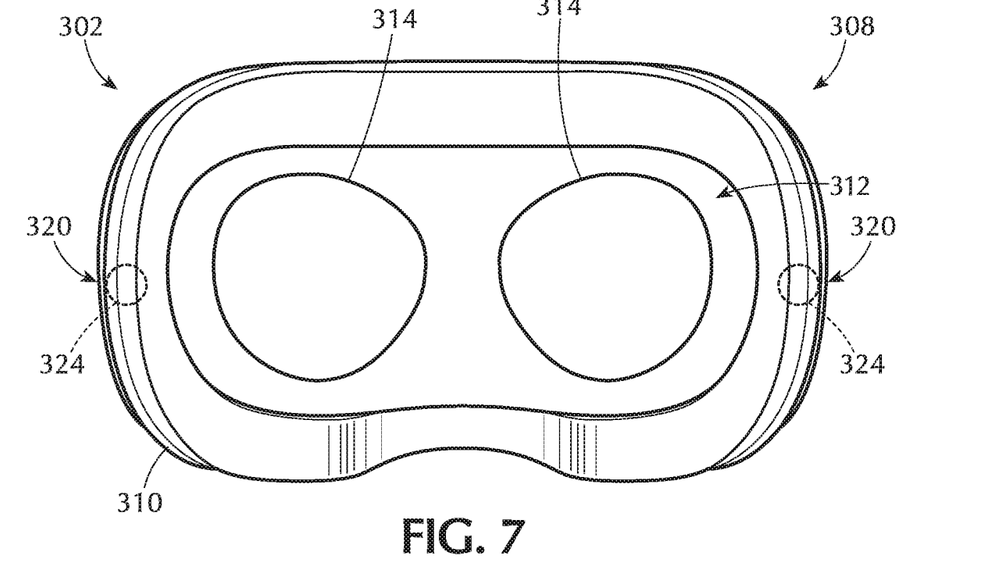
FIG. 7 is a front view of an exemplary head-mounted display in accordance with some embodiments.
Figure 8:
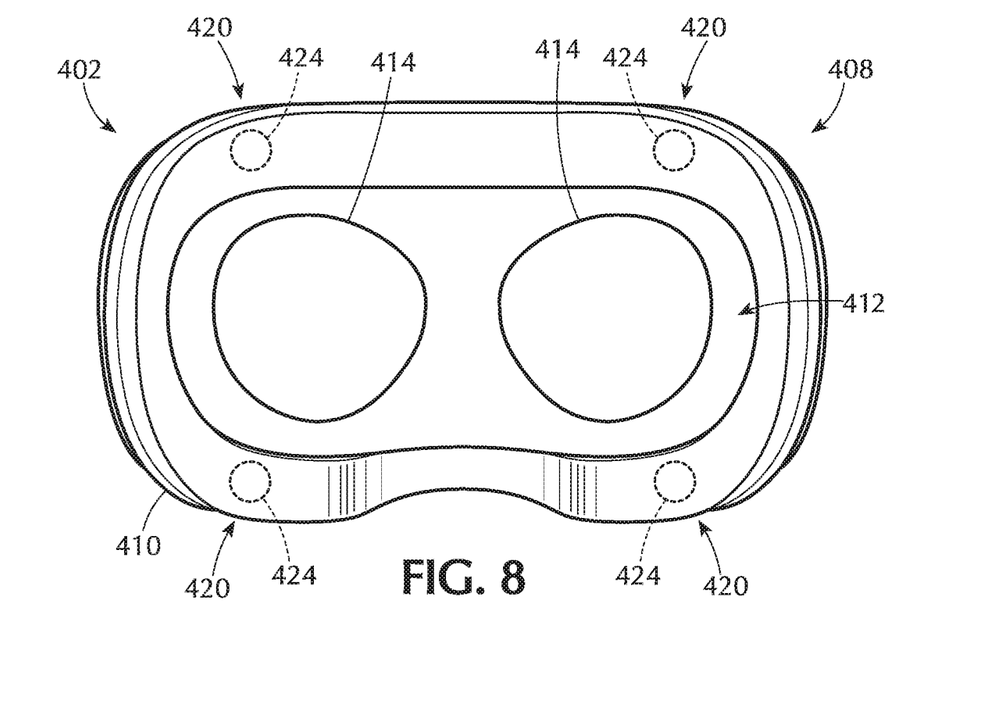
FIG. 8 is a front view of an exemplary head-mounted display in accordance with some embodiments.

FIGS. 6-8 show views of exemplary head-mounted displays having facial-interface adjustment apparatuses and/or adjustment protrusions that are disposed in various configurations. Head-mounted displays may include facial-interface adjustment apparatuses and/or adjustment protrusions that are disposed adjacent to portions of facial interfaces configured to abut various user facial regions, including nasal, cheek, temple, and/or forehead facial regions. Head-mounted displays, as disclosed herein, may include any suitable number of facial-interface adjustment apparatuses and/or adjustment protrusions disposed at any suitable locations, without limitation. FIG. 6 shows a front view of a head-mounted display 202 having a facial interface 210 that surrounds a viewing region 212, which allows a user to view content displayed through lenses 214. Head-mounted display 202 may include a plurality of facial-interface adjustment apparatuses 220, with each facial-interface adjustment apparatus 220 including an adjustment protrusion 224 coupled to facial interface 210. For example, head-mounted display 202 may include at least two facial-interface adjustment apparatuses 220 disposed adjacent to portions of facial interface 210 that abut left and right cheek regions of the user's face when the user wears head-mounted display 202.

FIG. 7 shows a front view of a head-mounted display 302 having a facial interface 310 that surrounds a viewing region 312, which allows a user to view content displayed through lenses 314. Head-mounted display 302 may include a plurality of facial-interface adjustment apparatuses 320, with each facial-interface adjustment apparatus 320 including an adjustment protrusion 324 coupled to facial interface 310. For example, head-mounted display 302 may include at least two facial-interface adjustment apparatuses 320 disposed adjacent to portions of facial interface 310 that abut left and right temple regions of the user's face when the user wears head-mounted display 302.

FIG. 8 shows a front view of a head-mounted display 402 having a facial interface 410 that surrounds a viewing region 412, which allows a user to view content displayed through lenses 414. Head-mounted display 402 may include a plurality of facial-interface adjustment apparatuses 420, with each facial-interface adjustment apparatus 420 including an adjustment protrusion 424 coupled to facial interface 410. For example, head-mounted display 402 may include at least four facial-interface adjustment apparatuses 420 disposed adjacent to various portions of facial interface 410, such as portions of facial interface 410 abutting left and right forehead and cheek regions of the user's face when the user wears head-mounted display 402.

Figure 9:
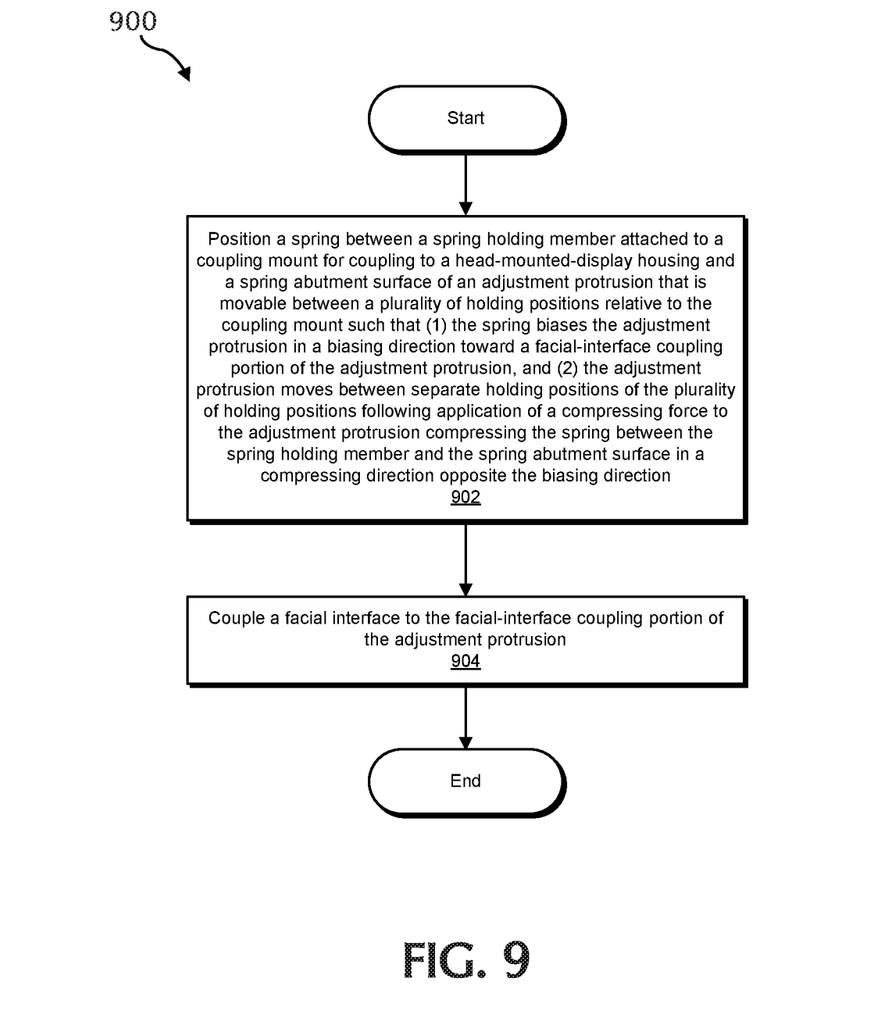
FIG. 9 is a block diagram of an exemplary method for assembling a facial-interface system for a head-mounted display in accordance with some embodiments.

FIG. 9 is a flow diagram of an exemplary method 900 for assembling a facial-interface system for a head-mounted display according to any of the embodiments disclosed herein. The steps shown in FIG. 9 may be performed by an individual and/or by any suitable manual and/or automated apparatus.

At step 902 in FIG. 9, a spring may be positioned between a spring holding member attached to a coupling mount for coupling to a head-mounted-display housing and a spring abutment surface of an adjustment protrusion that is movable between a plurality of holding positions relative to the coupling mount. The spring may be positioned between the spring holding member and the spring abutment surface of the adjustment protrusion such that (1) the spring biases the adjustment protrusion in a biasing direction toward a facial-interface coupling portion of the adjustment protrusion and (2) the adjustment protrusion moves between separate holding positions of the plurality of holding positions following application of a compressing force to the adjustment protrusion compressing the spring between the spring holding member and the spring abutment surface in a compressing direction opposite the biasing direction.

For example, spring 140 may be positioned between spring holding member 142 attached to coupling mount 146, which couples to head-mounted-display housing 103, and spring abutment surface 144 of adjustment protrusion 124 that is movable between a plurality of holding positions relative to coupling mount 146 (see, e.g., FIGS. 2-3B). Spring 140 may bias adjustment protrusion 124 in biasing direction X1 toward facial-interface coupling portion 125 of adjustment protrusion 124 (see, e.g., FIGS. 2-5E). Additionally, adjustment protrusion 124 may move between separate holding positions (e.g., the extended holding position illustrated in FIG. 3A and the contracted holding position illustrated in FIG. 3B) of the plurality of holding positions following application of a compressing force to adjustment protrusion 124 compressing spring 140 between spring holding member 142 and spring abutment surface 144 in compressing direction X2 opposite biasing direction X1.

At step 904 in FIG. 9, a facial interface may be coupled to the facial-interface coupling portion of the adjustment protrusion. For example, facial interface 110 may be coupled to facial-interface coupling portion 125 of adjustment protrusion 124 (see, e.g., FIGS. 3A and 3B).

In some embodiments, the coupling mount may be coupled to the head-mounted-display housing. For example, coupling mount 146 may be coupled to head-mounted-display housing 103. (See, e.g., FIGS. 2-3B). In at least one embodiment, a holding projection may be coupled to the coupling mount such that (1) the holding projection extends into a recessed path defined in the adjustment protrusion, and (2) the recessed path moves relative to the holding projection when the adjustment protrusion moves between the separate holding positions of the plurality of holding positions. For example, holding projection 152 may be coupled to coupling mount 146 such that (1) holding projection 152 extends into recessed path 160 defined in adjustment protrusion 124, and (2) recessed path 160 moves relative to holding projection 152 when adjustment protrusion 124 moves between the separate holding positions (e.g., the extended holding position illustrated in FIG. 3A and the contracted holding position illustrated in FIG. 3B) of the plurality of holding positions (see, e.g., FIGS. 3A-5E).

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed to assemble facial-interface system 108 and/or any other facial-interface system disclosed herein. The various exemplary methods described and/or illustrated herein may also omit one or more of the steps described or illustrated herein or include additional steps in addition to those disclosed.

As discussed throughout the instant disclosure, the disclosed methods, systems, and devices may provide one or more advantages over traditional hand-held controllers. For example, the facial-interface systems described herein may include facial-interface adjustment apparatuses that enable users to quickly and easily adjust facial interfaces. The facial-interface adjustment apparatuses may be coupled to head-mounted-display housings and may include spring-actuated adjustment protrusions that are movable between two or more holding positions relative to the head-mounted-display housings. The facial-interface systems may thus enable users to position the facial interfaces to comfortably fit head-mounted displays to various user face sizes and shapes. The facial-interface systems may also enable users to wear accessories, such as glasses, while wearing the head-mounted displays. Accordingly, the facial-interface systems may allow users to adjust and comfortably wear head-mounted displays without having to replace the facial interfaces and/or interface cushions. In general, the assemblies and systems disclosed herein may improve immersion and/or enjoyment of using a head-mounted display, making virtual- and augmented-reality experiences more fulfilling and/or useful.

The foregoing description, for purposes of explanation, has been described with reference to specific embodiments and has been provided to enable others skilled in the art to best utilize various aspects of the example embodiments disclosed herein. However, the illustrative discussions above are not intended to be exhaustive or to limit the scope of the claims to the precise forms disclosed. Many modifications and variations are possible in view of the above teachings without departing from the spirit and scope of the instant disclosure. The instant disclosure covers all modifications, equivalents, and alternatives falling within the scope of the appended claims. Features from any of the above-mentioned embodiments may be used in combination with one another in accordance with the general principles described herein. The embodiments were chosen to best explain the principles underlying the claims and their practical applications, to thereby enable others skilled in the art to best use the embodiments with various modifications as are suited to the particular uses contemplated. The embodiments disclosed herein should be considered in all respects illustrative and not restrictive. Reference should be made to the appended claims and their equivalents in determining the scope of the instant disclosure.

It will also be understood that, although the terms first, second, etc. are, in some instances, used herein to describe various elements, these elements should not be limited by these terms. These terms are used only to distinguish one element from another. For example, a first segment could be termed a second segment, and, similarly, a second segment could be termed a first segment, without departing from the scope of the various described embodiments. The first segment and the second segment are both segments, but they are not the same segment.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind." Unless otherwise noted, the terms "connected to," "coupled to," and "attached to" (and their derivatives), as used in the specification and claims, are to be construed as permitting both direct and indirect (i.e., via other elements or components) connection. Furthermore, two or more elements may be coupled together with an adhesive, a clasp, a latch, a hook, a link, a buckle, a bolt, a screw, a rivet, a snap, a catch, a lock, or any other type of fastening or connecting mechanism.

What is claimed is:

1. A facial-interface system for a head-mounted display comprising:
   a facial interface; and
   a facial-interface adjustment apparatus comprising:
   a coupling mount for coupling the facial-interface adjustment apparatus to a head-mounted-display housing;
   an adjustment protrusion that is movable between a plurality of holding positions relative to the coupling mount, the adjustment protrusion having a facial-interface coupling portion coupled to the facial interface;
   a holding projection that extends into a recessed path defined in the adjustment protrusion, the recessed path comprising a plurality of holding notches, each of the plurality of holding notches corresponding to a separate holding position of the plurality of holding positions; and
   a spring that applies a biasing force to the adjustment protrusion in a biasing direction toward the facial-interface coupling portion, wherein:
   application of a compressing force to the adjustment protrusion compresses the spring in a compressing direction opposite the biasing direction;
   the compressing of the spring causes the recessed path to move relative to the holding projection as the adjustment protrusion moves from a first holding position where the biasing force secures the holding projection within a first holding notch to a second holding position where the holding projection is within a second holding notch; and
   removal of the application of the compressing force to the adjustment protrusion causes further movement of the recessed path relative to the holding projection as the adjustment protrusion moves from the second holding position to a third holding position where the biasing force secures the holding projection within a third holding notch.

2. The facial-interface system of claim 1, wherein:
   the facial-interface adjustment apparatus further comprises a spring holding member attached to the coupling mount; and
   the spring is disposed between the spring holding member and a spring abutment surface of the adjustment protrusion.

3. The facial-interface system of claim 1, wherein the facial-interface adjustment apparatus further comprises an adjustment-apparatus casing surrounding at least a portion of the adjustment protrusion and the spring.

4. The facial-interface system of claim 3, wherein:
   a portion of the facial interface is disposed at a first distance from the adjustment-apparatus casing when the adjustment protrusion is in an extended position;
   the portion of facial interface is disposed at a second distance from the adjustment-apparatus casing when the adjustment protrusion is in a contracted position; and
   the first distance is greater than the second distance.

5. The facial-interface system of claim 1, wherein the facial interface is disposed at a separate one of a plurality of locations relative to the head-mounted-display housing when the adjustment protrusion is held at each of the plurality of holding positions.

6. The facial-interface system of claim 1, wherein the compressing force is applied to the adjustment protrusion via the facial interface.

7. The facial-interface system of claim 1, wherein the spring comprises a compression spring.

8. The facial-interface system of claim 1, wherein the facial-interface adjustment apparatus further comprises a holding-projection biasing member that biases the holding projection into the recessed path.

9. The facial-interface system of claim 1, wherein the recessed path comprises a looped path.

10. A head-mounted-display device comprising:
    a facial interface;
    a head-mounted-display housing; and
    a facial-interface adjustment apparatus comprising:
    a coupling mount that couples the facial-interface adjustment apparatus to the head-mounted-display housing;
    an adjustment protrusion that is movable between a plurality of holding positions relative to the head-mounted-display housing, the adjustment protrusion having a facial-interface coupling portion coupled to the facial interface;
    a holding projection that extends into a recessed path defined in the adjustment protrusion, the recessed path comprising a plurality of holding notches, each of the plurality of holding notches corresponding to a separate holding position of the plurality of holding positions; and
    a spring that applies a biasing force to the adjustment protrusion in a biasing direction toward the facial-interface coupling portion, wherein:
    application of a compressing force to the adjustment protrusion compresses the spring in a compressing direction opposite the biasing direction;
    the compressing of the spring causes the recessed path to move relative to the holding projection as the adjustment protrusion moves from a first holding position where the biasing force secures the holding projection within a first holding notch to a second holding position where the holding projection is within a second holding notch; and removal of the application of the compressing force to the adjustment protrusion causes further movement of the recessed path relative to the holding projection as the adjustment protrusion moves from the second holding position to a third holding position where the biasing force secures the holding projection within a third holding notch.

11. The head-mounted-display device of claim 10, wherein the coupling mount is disposed adjacent a viewing opening defined in the head-mounted-display housing.

12. The head-mounted-display device of claim 11, wherein the facial interface is disposed at a separate one of a plurality of locations relative to the head-mounted-display housing when the adjustment protrusion is held at each of the plurality of holding positions.

13. The head-mounted-display device of claim 10, wherein the compressing force is applied to the adjustment protrusion via the facial interface.

14. The head-mounted-display device of claim 10, wherein:
the facial-interface adjustment apparatus further comprises a spring holding member attached to the coupling mount; and
the spring is disposed between the spring holding member and a spring abutment surface of the adjustment protrusion.

15. The head-mounted-display device of claim 10, wherein the facial-interface adjustment apparatus further comprises a holding-projection biasing member that biases the holding projection into the recessed path.

16. The head-mounted-display device of claim 10, wherein the facial-interface adjustment apparatus further comprises an adjustment-apparatus casing surrounding at least a portion of the adjustment protrusion and the spring.

17. The head-mounted-display device of claim 16, wherein:
a portion of the facial interface is disposed at a first distance from the adjustment-apparatus casing when the adjustment protrusion is in an extended position;
the portion of facial interface is disposed at a second distance from the adjustment-apparatus casing when the adjustment protrusion is in a contracted position; and
the first distance is greater than the second distance.

18. A method comprising:
positioning a spring between a spring holding member attached to a coupling mount for coupling to a head-mounted-display housing and a spring abutment surface of an adjustment protrusion that is movable between a plurality of holding positions relative to the coupling mount;
coupling a holding projection to the coupling mount such that:
the holding projection extends into a recessed path defined in the adjustment protrusion; and
the recessed path moves relative to the holding projection when the adjustment protrusion moves between separate holding positions of the plurality of holding positions; and
coupling a facial interface to a facial-interface coupling portion of the adjustment protrusion, wherein:
the spring applies a biasing force to the adjustment protrusion in a biasing direction by pushing against the spring abutment surface and toward the facial-interface coupling portion of the adjustment protrusion;
application of a compressing force to the adjustment protrusion compresses the spring between the spring holding member and the spring abutment surface in a compressing direction opposite the biasing direction;
the compressing of the spring causes the recessed path to move relative to the holding projection as the adjustment protrusion moves from a first holding position where the biasing force secures the holding projection within a first holding notch to a second holding position where the holding projection is within a second holding notch; and
removal of the application of the compressing force to the adjustment protrusion causes further movement of the recessed path relative to the holding projection as the adjustment protrusion moves from the second holding position to a third holding position where the biasing force secures the holding projection within a third holding notch.

19. The method of claim 18, further comprising coupling the coupling mount to the head-mounted-display housing.

20. The method of claim 18, further comprising coupling a holding-projection biasing member to the holding projection such that the holding-projection biasing member biases the holding projection into the recessed path.

* * * * *